Mar. 27, 1923.
B. R. CORLEY
ENGRAVING MACHINE
Filed Feb. 4, 1921
1,450,136
6 sheets-sheet 2
Fig. 2.
Fig. 6.
Fig. 7.
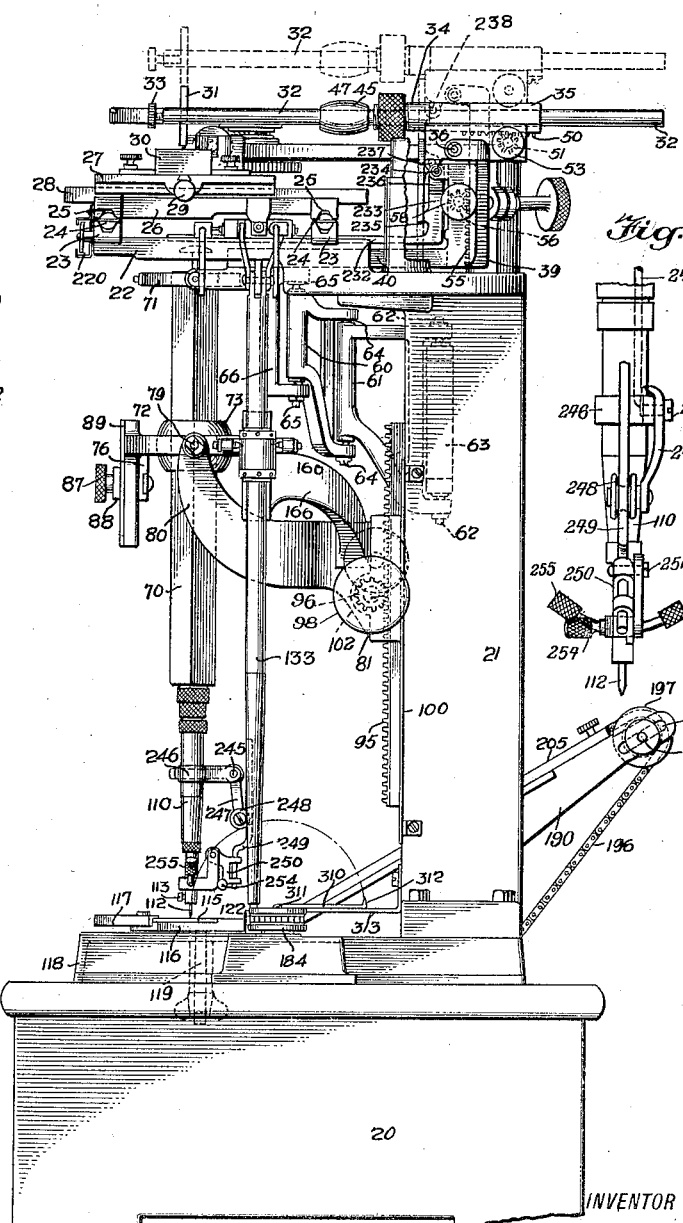
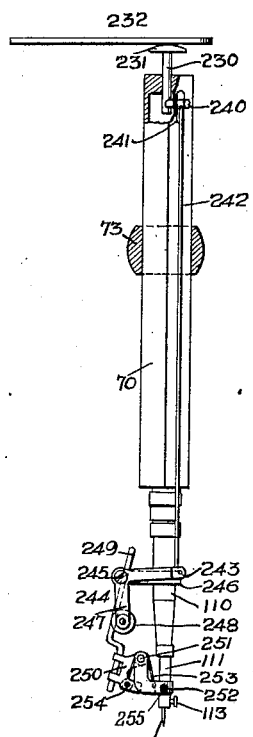
WITNESSES
INVENTOR
BENJAMIN R. CORLEY
BY
ATTORNEYS Mar. 27, 1923.
B. R. CORLEY
ENGRAVING MACHINE
Filed Feb. 4, 1921
1,450,136
6 sheets-sheet 3
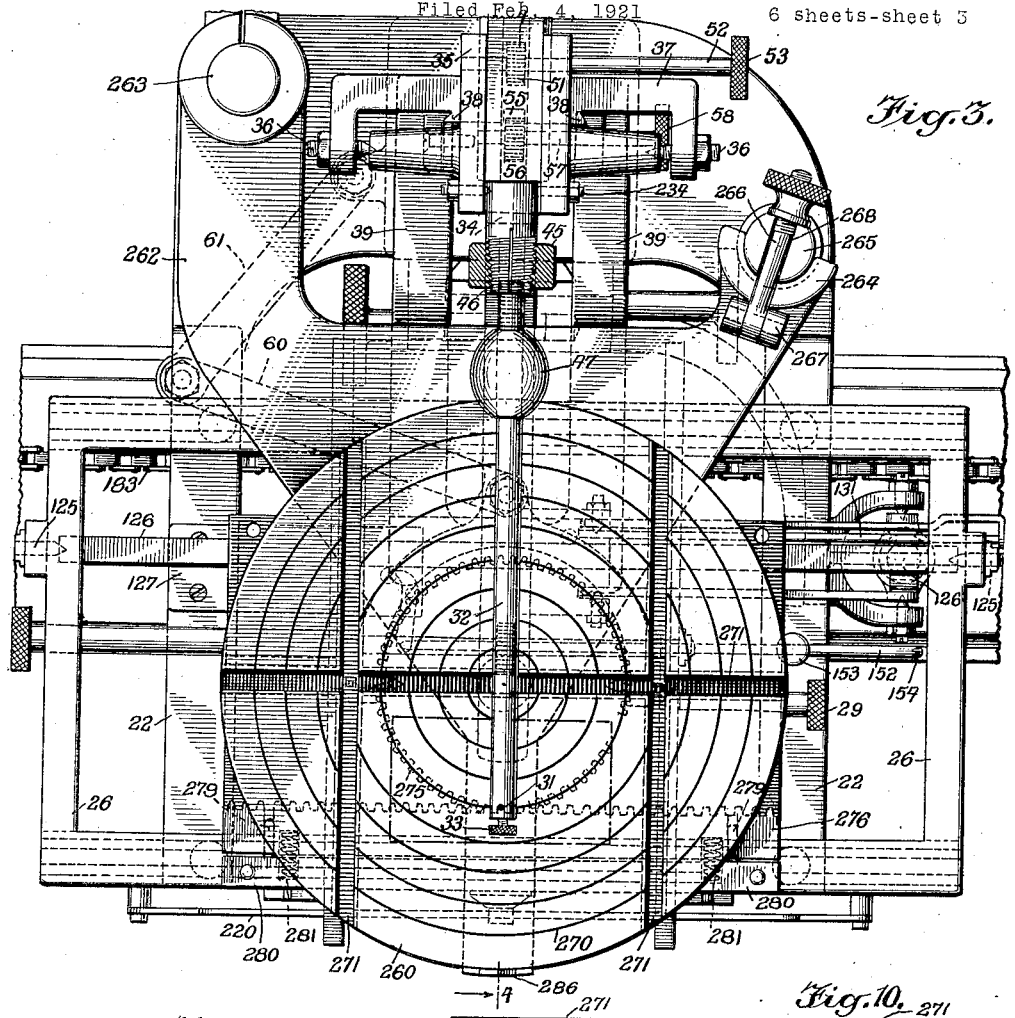
Fig. 3.
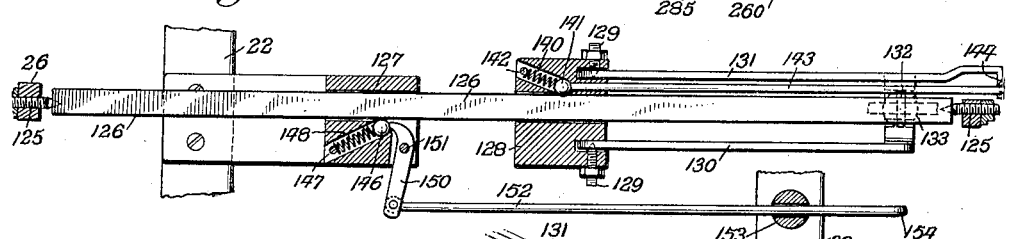
Fig. 8.    Fig. 10.
Fig. 9.
WITNESSES
INVENTOR
BENJAMIN R. CORLEY
BY
ATTORNEYS Mar. 27, 1923.

B. R. CORLEY 1,450,136

ENGRAVING MACHINE

Filed Feb. 4, 1921

WITNESSES

INVENTOR
BENJAMIN R. CORLEY
BY
ATTORNEYS

Mar. 27, 1923.
B. R. CORLEY
1,450,136
ENGRAVING MACHINE
Filed Feb. 4, 1921
6 sheets-sheet 5
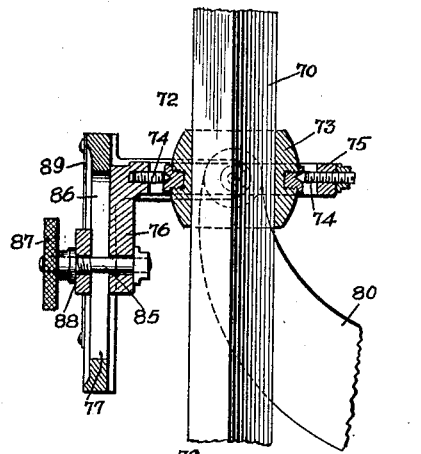
Fig. 11.
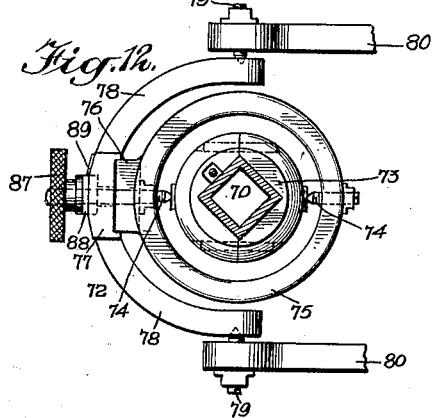
Fig. 12.
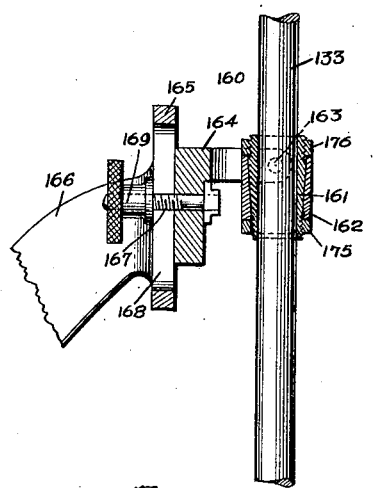
Fig. 13.
Fig. 14.
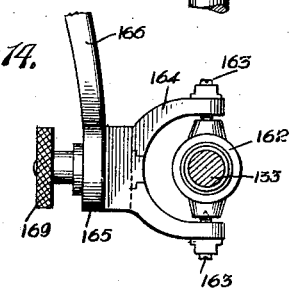
Fig. 17.ᵃ
WITNESSES
INVENTOR
BENJAMIN R. CORLEY
BY
ATTORNEYS Mar. 27, 1923.
B. R. CORLEY
ENGRAVING MACHINE
Filed Feb. 4, 1921
1,450,136
6 sheets-sheet 6
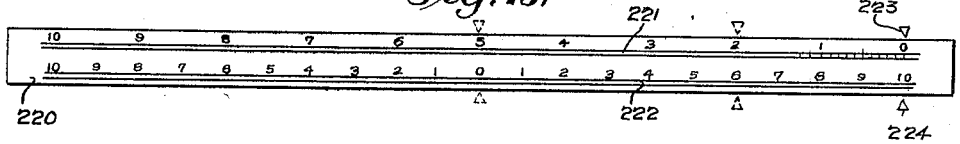
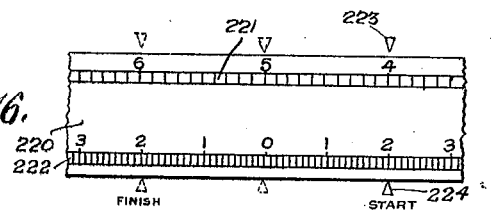
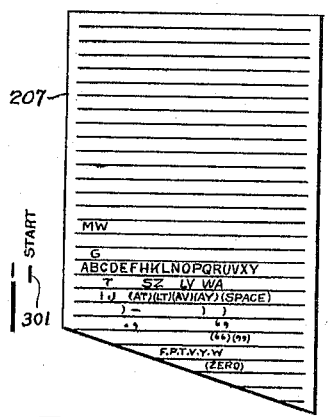
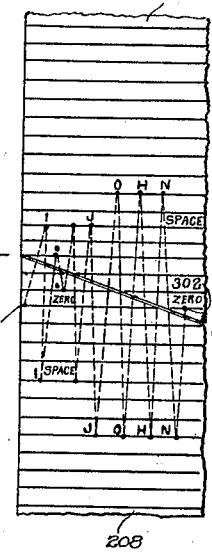
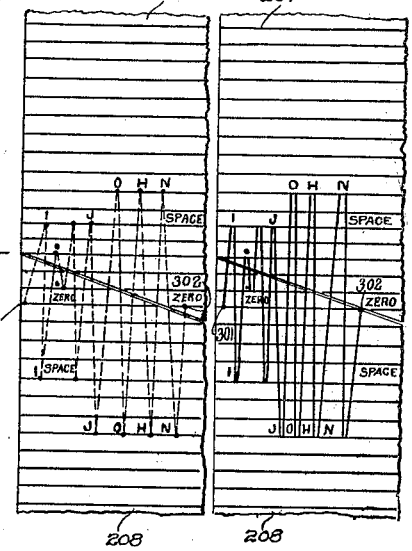
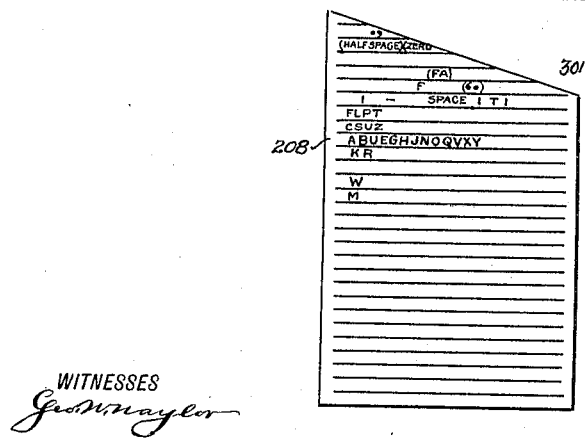
WITNESSES
INVENTOR
BENJAMIN R. CORLEY
BY
ATTORNEYS Patented Mar. 27, 1923.

1,450,136

UNITED STATES PATENT OFFICE.

BENJAMIN R. CORLEY, OF BROOKLYN, NEW YORK.

ENGRAVING MACHINE.

Application filed February 4, 1921. Serial No. 442,518.

*To all whom it may concern:*

Be it known that I, BENJAMIN R. CORLEY, a citizen of the United States, and a resident of the city of New York, borough of Brooklyn, in the county of Kings and State of New York, have invented a new and Improved Engraving Machine, of which the following is a full, clear, and exact description.

The invention relates to engraving machines using a needle for engraving letters of the alphabet, numerals, signs and other characters on a coated plate, and controlling the said needle by a mechanism including a manually controlled transmitter carrying a stylus used for tracing the desired character on a master plate.

The object of the invention is to provide a new and improved engraving machine arranged to enable the operator to accurately space the letters, numerals, signs or other characters irrespective of their width and shape.

Another object is to engrave the characters in a straight line or in an arch line or in an inverted arch line.

Another object is to permit of proportioning a character to be engraved to any desired width relative to the original characters on the master plate.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 2 is a side elevation of the same with a part broken out;

Figure 3 is an enlarged plan view of the improved engraving machine with the parts in position for arch line work, one of the parts being shown in section;

Figure 6 is a side elevation of the transmitter and the lowering and raising device for the needle support, parts being shown in section;

Figure 7 is a rear elevation of the same;

Figure 8 is an enlarged sectional plan view of the shifting and locking mechanism for the straight line work bed;

Figure 9 is a perspective view of a portion of the same;

Figure 10 is a front elevation of the rotary work bed;

Figure 11 is an enlarged sectional side elevation of the adjustable pivot for the transmitter;

Figure 12 is a plan view of the same with parts shown in section;

Figure 13 is an enlarged sectional side elevation of the adjustable pivot for the shifting lever;

Figure 14 is a plan view of the same with the shifting lever shown in section;

Figure 15 is an enlarged front elevation of the scale attached to the fixed support or guideway on which the work bed is mounted to slide sidewise;

Figure 16 is an enlarged face view of a portion of the scale with the pointer thereof in a different position from that shown in Figure 15;

Figure 17 is a face view of the upper and lower charts;

Figure 1:
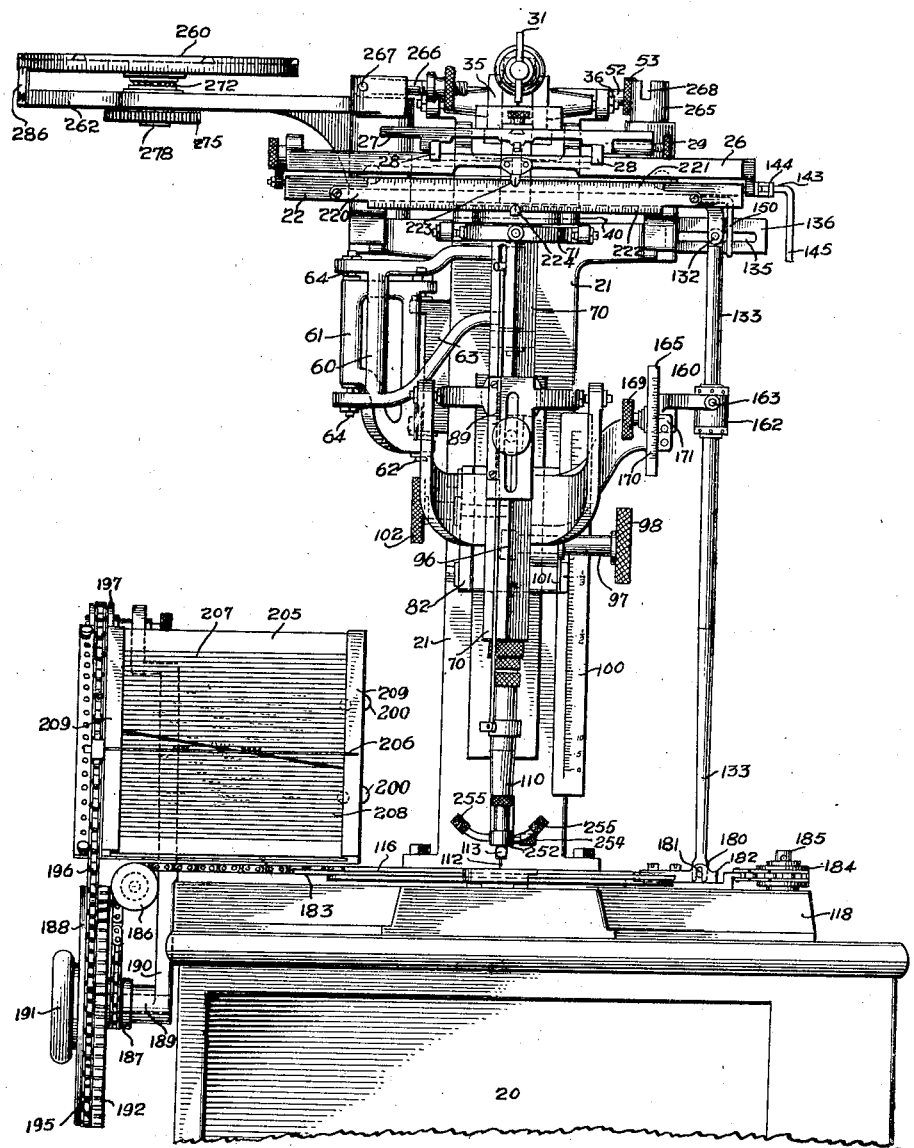
Figure 1 is a front elevation of the improved engraving machine with the parts in position for straight line work.

Figure 17ª is an enlarged plan view of the adjacent diagonal ends of the upper and lower charts;

Figure 18 is a diagrammatic view illustrating the working of the spacing device on a given example;

Figure 19 is a similiar view of the same at another stage of the operation of the machine; and Figure 20 is a diagrammatic view illustrating the positioning marks relative to a given example.

The engraving machine is mounted on a stand 20 on which is erected a column 21 supporting at its upper portion a support 22 provided with longitudinally extending guideways 23 engaged by balls 24 on which rest grooved members 25 forming integral portions of the under side of a work bed 26 provided with the usual auxiliary bed 27, adapted to be adjusted in a transverse direction on a transverse guideway 28 and to be then fastened in place by a clamping screw 29. On the auxiliary bed 27 rests the coated plate 30 to be engraved by a needle 31. By the arrangement described the work bed 26 can be readily moved in a sidewise direction and the auxiliary bed 27 with the coated plate 30 thereon can be adjusted on the guideway 28 in a transverse direction to position properly the coated plate 30 relative to the needle 31.

The needle 31 is attached to the front end of a needle support 32 by a set screw 33, and the rear end of the needle support is mounted to slide transversely in a holder 34 mounted to slide in a guideway 35 hung on centers 36 held on a bracket 37 mounted to slide up and down in guideways 38 arranged on lugs 39 forming integral parts of the rear end of a carriage 40 mounted to move in a lateral direction, as hereinafter more fully explained. The needle support, 32 after being transversely adjusted by the operator in the holder 34 is locked thereto by a nut 45 (see Figure 3) screwing on the forward threaded tapering and slotted end 46 of the holder 34 to clamp the needle support 32 in position in the holder 34. The needle support 32 is provided with a counterbalancing weight 47 to counterbalance the needle support, that is, to hold the point of the needle 31 in proper contact with the coated surface of the plate 30 to be engraved. It is understood that the needle support 32 swings up and down with the centers 36 as the fulcrum owing to the mounting of the holder 34 in the guideway 35 hung on the said centers 36. In order to move the holder 34 forward or backward in the guideway the under side thereof is provided with a rack 50 in mesh with a pinion 51 secured on a shaft 52 journaled in the guideway 35 and provided at its outer end with a knob 53 for conveniently turning the shaft 52 with a view to cause the pinion 51 to shift the holder 34 in the guideway 35 and consequently the needle support 32 forward or backward according to the direction in which the knob 53 is turned at the time. It will be noticed that on loosening the nut 45 a rough transverse adjustment of the needle support 32 can be made and when this has been done the nut 45 is screwed up to clamp the needle support 32 in position in the holder 34, and then the operator turns the knob 53 to minutely adjust the needle support with a view to locate the needle 31 in proper position relative to the coated surface of the plate 30 to be engraved. The bracket 37 and the needle support 32 carried thereby can be bodily raised or lowered and for this purpose the bracket 37 is provided with a vertically disposed rack 55 in mesh with a pinion 56 secured on a shaft 57 journaled on the lugs 39 of the carriage 40, and on the outer end of the shaft 57 is secured a knob 58 under the control of the operator for turning the shaft 57 with a view to raise or lower the bracket 37 and the parts carried thereby for the purpose hereinafter more fully described.

The carriage 40 is supported by two links 60, 61, of which the link 61 is hung at vertical centers 62 engaging a lug 63 forming part of the column 21. The links 60 and 61 are pivotally connected with each other by vertical centers 64, and the free end of the link 60 is mounted on vertical centers 65 held in a bracket 66 depending from the under side of the carriage 40. It will be noticed that by the arrangement described the carriage 40 can be readily moved in a lateral direction without requiring much force and without producing any undue vibration. The lateral movement of the carriage 40 is controlled by a transmitter 70 having a universal joint connection 71 with the bracket 66 supporting the carriage 40. The transmitter 70 is hung on a vertically adjustable universal pivot 72 arranged as follows, special reference being had to Figures 1, 2, 11 and 12: The transmitter 70 is preferably made in the form of a tubular bar polygonal in cross section, and on the transmitter is mounted with a close sliding fit a sleeve 73 hung on horizontal centers 74 carried by a ring 75 provided with a depending arm 76 mounted to slide in a vertical guideway 77 formed on a bracket 78 made semicircular and hung on centers 79 carried by arms 80 of a bracket 81 mounted to slide up and down on a suitable guideway 82 arranged on the front of the column 21. The arm 76 is provided with a bolt 85 extending through a vertical slot 86 formed in the guideway 77, and the nut 87 of the bolt 85 screws against a washer 88 engaging the outer face of the guideway 77 to securely clamp the arm 76 in position on the guideway 77 after the desired vertical adjustment of the arm 76 and the sleeve 73 has been made. In order to enable the operator to visualize the minute adjustment of the sleeve 73, the face of the guideway 77 is provided with a scale 89 representing a linear measurement and on which indicates the washer 88 as a pointer. The bracket 81 is vertically adjusted by the use of a rack and pinion 95, 96, of which the rack 95 is secured to the front of the column 21 and the pinion 96 is secured on a shaft 97 journaled in the bracket 81. On the outer end of the shaft 97 is secured a knob 98 to permit the operator to readily turn the shaft 97 and with it the pinion 96 to move the bracket 81 up or down on the guideway 82 according to the direction in which the knob 98 is turned. It will be noticed that by this up or down movement of the bracket 88 the bracket 78 and with it the sleeve 73 is moved up or down to locate the fulcrum of the transmitter 70 higher up or further down according to the desired proportional movement to be given to the carriage 40, as hereinafter more fully explained. In order to permit of conveniently setting the bracket 81 to the desired proportion use is made of a graduation 100 attached to the front of the column 21 and on which indicates a pointer or mark 101 (see Figure 1) on the bracket 81. The zero mark of the graduation 100 is at the lower end thereof and when the bracket 81 has been lowered to this point then the proportional movement of the transmitter 70 to the carriage 40 is 1 to 1, and when the bracket 81 has been moved to uppermost position the proportional movement of the transmitter and carriage is reduced to 20 to 1, and proportional movements are indicated between the zero and the uppermost marks on the graduation 100. After the desired adjustment of the bracket has been made the bracket is locked in place by a suitable binding screw 102.

Figure 5:
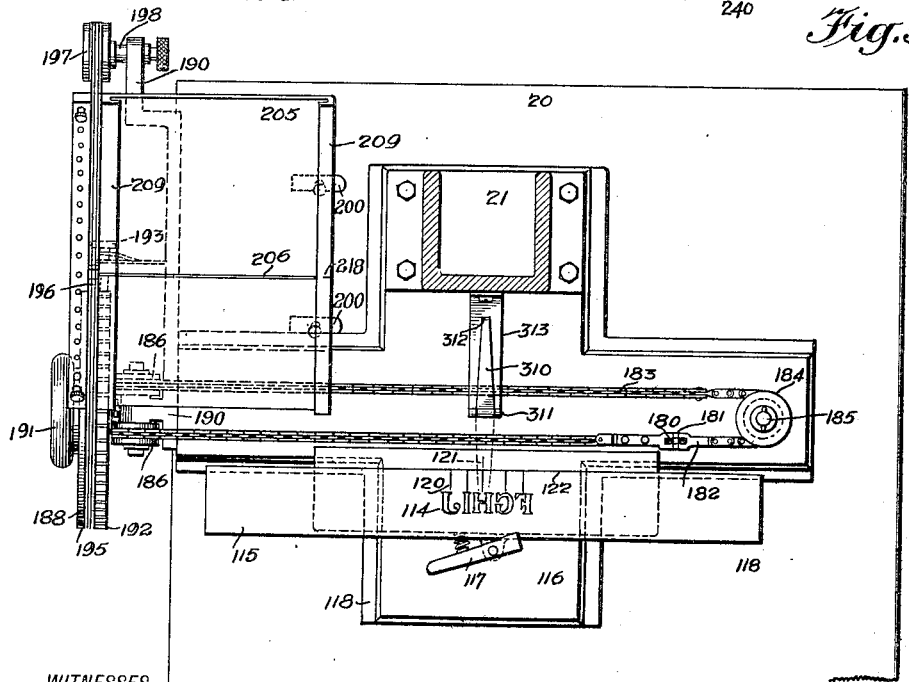
Figure 5 is a sectional plan view of the lower portion of the improved engraving machine.

The transmitter 70 is provided at its lower portion with a bearing 110 in which is mounted to slide a stylus holder 111 carrying a stylus 112 fastened in place by a set screw 113. The stylus 112 is adapted to trace letters of the alphabet, numerals, signs or other characters 114 formed on a master plate 115 mounted to slide sidewise in a plate holder 116 provided with a clamping lever 117 for locking the master plate temporarily in place in the holder 116, that is, during the time the stylus 112 is moved along the outline of the character 114 to be engraved at the time by the needle 31 on the plate 30. The plate holder 116 is transversely adjustable on the base 118 of the column 21 and is adapted to be fastened in the adjusted position by a clamping bolt 119 shown in Figure 2. Each character 114 on the master plate 115 has associated therewith a positioning mark 120 adapted to register with a mark 121 on the top of a rear ledge 122 of the plate holder 116 and against which ledge abuts the rear edge of the master plate 115, as will be readily understood by reference to Figure 5. The mark 121 is preferably located in a vertical transverse plane containing the axis of the transmitter 70 at the time the latter is in vertical position.

In order to shift the work bed 26 sidewise according to the width of any individual character to be engraved on the plate 30, use is made of a spacing device arranged as follows (see Figures 1, 2, 3, 5, 8 and 9): The ends of the work bed 26 are provided with centers 125 engaging the ends of a shifting bar 126 polygonal in cross section and mounted to slide in a bearing 127 attached to the left-hand side of the support 22. On the bar 126 is mounted to slide a gripping head 128 provided with centers 129 engaging side arms 130, 131 pivotally connected with a pivot 132 secured on the upper end of a shifting lever 133. The pivot 132 extends through a guide slot 135 formed in a bracket 136 attached to or forming part of the right-hand side of the support 22. In practice the axis of the pivot 132 connecting the shifting lever 133 with the side arms 130 and 131 of the gripping head 128 is located in the same horizontal plane as that of the universal joint connection 71 (see Figure 1) which connects the transmitter 70 with the carriage 40. The gripping head 128 is provided with an opening 140 extending at an angle to the axis of the shifting bar 126, and in the opening 140 is held a ball 141 pressed on by a spring 142 to engage the ball with the shifting bar 126 to clamp the gripping head 128 to the shifting bar 126 with a view to move the said bar from the right to the left on imparting a movement to the gripping head 128 in this direction by the action of the shifting lever 133. During the return movement of the gripping head 128 from the left to the right, the shifting bar 126 will remain at a standstill while the ball 141 travels on the bar 126. The ball 141 is adapted to be moved into release position relative to the shifting bar 126 by the use of a release rod 143 mounted to slide at one end in the gripping head 128 and at its other end in a bearing 144 formed on the side arm 131. The right-hand end of the release rod 143 terminates in a depending handle 145 adapted to be pressed by the operator from the right to the left to push the ball 141 into release position whenever it is desired to quickly return the work bed 26. In order to hold the shifting bar 126 against accidental return movement during the return movement of the gripping head 128 use is made of another gripping ball 146 mounted in an inclined opening 147 formed in the bearing 127 previously mentioned, and the ball 146 is pressed on by a spring 148 to hold the said ball 146 in firm contact with the shifting bar 126 for locking the latter against return movement. The ball 146 is adapted to be moved into release position relative to the shifting bar 126 by a release lever 150 fulcrumed at 151 on the bearing 127. The lever 150 is pivotally connected with one end of a release rod 152 mounted to slide in a bearing 153 forming part of the support 22. The end of the release rod 152 is provided with a depending handle 154 adapted to be pulled by an operator from the left to the right to impart a swinging motion to the release lever 150 for the latter to push the ball 146 into release position. It is understood that the handles 154 and 145 are pressed on simultaneously towards each other to simultaneously move the balls 141 and 146 into release position to allow quick shifting movement of the work bed 26 in either direction.

The shifting lever 133 for the spacing device of the work bed 26 has an adjustable fulcrum 160 (see Figures 1, 2, 13 and 14). On the shifting lever 133 is fitted a tapering sleeve 161 mounted in a bearing 162 hung on transverse centers 163 mounted in a fork-shaped arm 164 vertically adjustable on the end 165 of a bracket 166 attached to or forming part of the bracket 81 previously mentioned. The arm 164 is provided with a clamping bolt 167 extending through a slot 168 in the bracket end 165, and the nut 169 of the bolt 167 engages the inner face of the bracket end 165 to clamp securely the arm 164 in the adjusted position. On the front edge of the bracket end 165 is arranged a linear graduation on which indicates a mark 171 arranged on the arm 164 to indicate the position of the arm 164 on the bracket end 165. It will be noticed that by the arrangement described a minute adjustment of the fulcrum 160 in an up or down direction can be had by the operator loosening the nut 169 and then shifting the arm 164 correspondingly up or down. It will further be noticed that as the bracket 166 forms part of the bracket 81 it moves up or down with the latter on adjusting the bracket 81 as previously explained, thus shifting the fulcrum 160 correspondingly in unison with the universal pivot 72 for the transmitter 70. On the lower threaded end of the sleeve 161 screws a nut 175 abutting against the under side of the bearing 162 to permit of taking up wear in the sleeve 161 by screwing up the nut 175. On the upper threaded end of the sleeve 161 screws a nut 176 resting on top of the bearing 162 and serving to prevent wedging of the sleeve 161 when raising the bracket 166.

The lower end of the shifting lever 133 is provided with a fork 180 (see Figure 1) engaging a transverse pin 181 carried by a link 182 forming part of an endless sprocket chain 183 passing around a pulley 184 journaled on a stud 185 mounted on the base 118. The endless sprocket chain 183 also passes around guide pulleys 186 journaled on a bracket 190 attached to the base 118, the sprocket chain 183 then passes around the sprocket hub 187 of a wheel 188 having its shaft 189 journaled in the bracket 190. It will be noticed that when the wheel 188 is turned a positive traveling motion is given to the endless sprocket chain 183 to impart a sidewise swinging movement to the shifting lever 133 which by the side arms 130, 131 imparts movement to the gripping head 128. It is understood that when the wheel 188 is turned in one direction and motion is imparted to the gripping head 128 from the right to the left then the shifting bar 126 is moved in this direction and with it the work bed 26, and when the wheel 188 is turned in the opposite direction then the gripping head 128 is moved from the left to the right and the shifting bar 126 is held against movement by the ball 146 while the gripping head 128 slides on the shifting bar 126. The wheel 188 is provided with a suitable knob 191 to permit the operator to turn conveniently the wheel 188 in either direction. The peripheral face of the wheel 188 is provided with equally spaced notches 192 adapted to be engaged by a spring-pressed pin 193 mounted to slide in the bracket 190. By the arrangement described the wheel 188 is held against accidental turning and whenever it is desired to turn the wheel 188 the pin 193 is pulled out of engagement with the corresponding notch 192 to unlock the wheel 188.

The peripheral face of the wheel 188 is provided with sprockets 195 engaged by an endless sprocket chain 196 passing around a sprocket wheel 197 journaled on a stud 198 adjustably secured in a slot 199 formed in the upper end of the bracket 190. The upper run of the sprocket chain 196 passes over a table 205 attached to or forming part of the bracket 190, and the said table 205 is inclined rearwardly and upwardly to be within convenient view of the operator usually seated in the front of the machine. On the upper run of the sprocket chain 196 is secured a sidewise extending pointer 206 adapted to indicate on two charts 207, 208 slidably mounted at their side edges in guideways 209 forming part of the table 205. Suitable spring clamps 200 mounted on the under side of the table 205 serve to hold the charts in the adjusted position. The adjacent edges 210, 210 of the charts 207, 208 are diagonally disposed relative to the horizontal spaces 211, 212 containing letters of the alphabet, punctuation signs or other characters 213 and 214 arranged according to their width, that is, characters of the same width are arranged in one space and characters of another width are arranged in another space. The characters 213 on the chart 207 are arranged in spaces 211 according to their width beginning with the lowest space for the various characters and with the upper space for the widest letter. In a like manner the characters 214 are arranged in the spaces 212 beginning with the narrowest characters on the uppermost space and with the widest characters on the lowermost space. The charts 207 and 208 are held spaced apart more or less according to the spaces to be given to the adjacent characters of the matter to be engraved. The diagonal division between the charts 207 and 208 is for the short spacing required for a punctuation mark or for an apostrophe. The punctuation marks on the upper chart 207 are for going toward the punctuation mark, and the marks on the lower chart 208 are from the rear of the punctuation mark to the center of the space. It will be noticed that the punctuation marks on the upper chart 207 are above the "zero" spacing line, and the punctuation marks on the lower chart 208 are likewise above the "zero" spacing line, owing to the diagonal edges of the charts 207, 208. The guideways 209 are provided with positioning lines 218 (see Figure 5) to position the charts 207, 208 relative to the "zero" spacing lines. When the pointer 206 stands in register with the "zero" spacing lines of the charts 207, 208 and the positioning lines 218 then it is in zero position (see Figures 1 and 5). The characters 213 and 214 correspond in style and width to the characters 114 on the master plate 115, and it is understood that with master plates having characters 114 of different styles corresponding charts 207 and 208 are used and provided with corresponding characters 213 and 214.

In order to enable the operator to properly center the matter to be engraved on the plate 30 according to the master plate 115 and the charts 207, 208, use is made of a scale attached to the front of the forward guideway 23 of the support 22 (see Figures 1, 2, 15 and 16). The scale 220 is provided near its upper margin with a linear graduation 221 representing inches subdivided in ten parts with zero at the right-hand side of the graduation 221. Near the lower margin of the scale 220 is arranged a second linear graduation 222 scaled 1 to 2 relative to the graduation 221 with the zero mark opposite the 5-inch mark on the graduation 221 and with the scaled or proportioned inches extending to the right and the left in consecutive order. On the graduations 221 and 222 indicate two pointers 223, 224 attached to the front of the work bed 26 to move with the latter. It is understood that the pointers 223 and 224 are arranged in vertical alinement with each other and when the pointer 223 indicates at zero of the graduation 221 then the pointer 224 indicates on the 10-inch mark of the right-hand portion of the graduation 222. When the pointer 223 is at the 5-inch mark of the graduation 221 then the pointer 224 is at the zero mark of the graduation 222. The said pointers are now in vertical alinement with the needle 31, the axis of the transmitter 70 and the mark 121 on the plate holder 116.

The needle support 32 is normally held in uppermost position, that is, with the needle 31 a short distance above the top of the coated plate 30, and in order to allow the needle support 32 to swing downward by its own weight with a view to engage the needle 31 with the coated surface of the plate 30 the following arrangement is made, special reference being had to Figures 2, 4, 6 and 7: On the upper end of the transmitter 70 is mounted to slide up and down the shank 230 of a button 231 engaging the under side of the free end of an arm 232 provided at its rear end with an upwardly extending angular member 233 fulcrumed at 234 on the carriage 40. The member 233 is provided at its forward edge with a lug 235 engaging the lower portion of a vertically disposed arm 236 pivoted at 237 on the guideway 35. The upper end 238 of the arm 236 abuts against the face of the guideway 35 and hence when the button 231 is moved into uppermost position as shown in Figure 6 and an upward swinging motion is given to the arm 232 then an upward swinging motion is imparted to the guideway 35 by the arm 236 to hold the needle 31 out of engagement with the plate 30. When the button 231 is moved downward then the arm 232 moves downward and thus allows a return movement of the arm 236 and the guideway 35 to engage the needle 31 with the coated surface of the plate 30 (see Figures 2 and 4). The button 231 is normally held in uppermost position and consequently the needle 31 is in raised position with the point of the needle 31 a distance above the coated surface of the plate 30. In order to impart a downward sliding movement to the button 231 a manipulating device is provided mounted on the transmitter 70 so as to be within convenient reach of the operator manipulating the transmitter 70 in the usual manner. The manipulating device is arranged as follows: On the lower end of the shank 230 is secured a pin 240 extending through a slot 241 formed in the upper end of the transmitter 70. The outer end of the pin 240 is connected with a downwardly extending link 242 pivotally connected with an arm 243 of a bell crank lever 244 fulcrumed at 245 on a bracket 246 attached to the bearing 110 of the transmitter 70 (see Figures 2, 6 and 7). On the vertical member 247 of the bell crank lever 244 is journaled a grooved pulley 248 engaged by a rod 249 secured to a hand lever 250 fulcrumed at 251 on a bracket 252 secured to the stylus holder 111 to move up and down with the same. The lever 250 is pressed on by a spring 253 to normally hold the parts in the position shown in Figure 6, that is, with the button 231 in raised position. On the lever 250 is secured a sidewise extending handle 254 adapted to be engaged by one of the fingers of the operator having hold with both hands on handles 255 projecting sidewise from the bracket 252. It is understood that when the operator swings the hand lever 250 forward then the rod 249 releases the bell crank lever 244 to allow the button 231 to drop with a view to permit the needle support 32 to swing downward to engage the needle 31 with the coated surface of the plate 30. When the operator releases the handle 254 then the spring 253 imparts a rearward swinging movement to the lever 250 whereby the rod 249 in engagement with the pulley 248 imparts a swinging motion to the bell crank lever 244 to positively move the button 231 upward to impart a swinging motion to the arm 232, as previously explained, to swing the needle support 32 upward and the needle 31 out of engagement with the coated surface of the plate 30.

The engraving machine so far described permits of engraving only straight line work owing to the sidewise movement given by the spacing device for the work bed 26. In order to permit of doing arch line or inverted arch line work use is made of an auxiliary revoluble work bed 260 of circular shape and on which rests the coated plate 30 to be engraved by the needle 31. The revoluble work bed 260 is provided at its under side with a fixed shaft 261 mounted to turn in a support 262 fulcrumed on a stud 263 (see Figure 3) held on the top of the column 21. The support 262 is provided with a fork 264 adapted to engage a stud 265 mounted on the top of the column 21 and a locking bolt 266 is pivoted at 267 on the support 262 and is adapted to engage a slot 268 formed in the top of the stud 265 to lock the support 262 in position after the support 262 has been swung from its normal dormant position on the left-hand side of the machine (see Figure 1) into forward active position, shown in Figures 3 and 4. When the support 262 is locked in this position the axis of the revoluble work bed 260 coincides with the axis of the transmitter 70 when the latter is in vertical position. Prior to moving the support 262 and the revoluble work bed 260 from the inactive into working position it is necessary for the operator to raise the needle support to the position shown in Figure 4 and in dotted lines in Figure 2, by correspondingly turning the knob 58 to raise the bracket 37 and the parts supported thereby. It is understood that in raising the needle support 32 as described the arm 236 remains in engagement with the lug 235 on the vertical member 233 of the arm 232 and hence the button 231 controls the lowering of the needle support 32 the same as previously described relative to the plate 30 on the work bed 26, the only difference now being that the needle 31 moves into engagement with the coated surface of the plate 30 resting on the revoluble work bed 260.

The upper face of the work bed 260 is provided with concentric circles 270 to permit of readily positioning the plate 30 on the work bed 260 according to the larger or smaller arch line in which the characters are to be engraved on the plate 30. If the plate 30 is placed on the revoluble work bed 260 in the front of its center then the work is engraved in the regular arch line, and when the plate 30 is placed on the revoluble work bed 260 in the rear of its center then the work is engraved in inverted arch line. It is understood that the usual fastening means are employed for fastening the plate 30 in place on the revoluble work bed 260, the latter being for this purpose provided with the usual dovetail grooves 271. In order to insure an easy turning of the work bed 260 a ball bearing 272 is interposed between the support 262 and the under side of the revoluble work bed 260. In order to obtain the desired spacing of the characters the revoluble work bed 260 is correspondingly turned from the straight line work bed 26 controlled by the spacing device above described. For this purpose the shaft 261 is provided at its lower end with a gear wheel 275 in mesh with a rack 276 detachably mounted on the top of the auxiliary bed 27 of the straight line work bed 26. Different sized gear wheels 275 are used according to the concentric circles 270 on which the plate 30 is positioned according to the radius of the arch line on which the characters are to be placed at the time for any given piece of work. It is understood that the auxiliary bed 27 is correspondingly adjusted in a transverse direction to mesh the rack 276 with the gear wheel 275 in use at the time. In practice the gear wheel 275 is attached to the shaft 261 by a key 277 to rotate the shaft, and a screw 278 screwing in the shaft 261 serves to hold the gear wheel in position on the lower end of the shaft, as will be readily understood by reference to Figure 4. The rack 276 is held to slide on horizontal dowel pins 279 mounted in a bar 280 detachably held on the front of the auxiliary bed 27. Springs 281 are partly mounted in recesses in the bar 280 and partly in recesses in the rack 276 to hold the latter in mesh with the gear wheel 275. The peripheral edge of the work bed 260 is provided with a graduation 285 indicating degrees having zero at the front and rear and running at 90° at the sides (see Figure 10) and on this graduation 285 indicates a pointer 286 attached to the support 262 to enable the operator to properly center the matter to be engraved on the plate 30. It is understood that the revoluble work bed 260 is used only for arch line work and the support 262 carrying the revoluble work bed 260 is swung to one side when the machine is used for straight line work held on the work bed 260 as above explained.

The operation is as follows:

Presuming that the several parts are in the positions shown in Figures 1 and 2 and with the support 262 and the revoluble work bed 260 in inactive position, and it is desired to engrave the straight line legend "I. JOHN" centrally on the coated plate 30, then the operator first moves the work bed 26 to the right until the pointers 223 and 224 register with zero and 10 of the graduations 221 and 222, as indicated in Figure 15. The pointer 206 of the spacing device is in zero position, as shown in Figure 1, and this starting position is represented by an imaginary starting mark 301 (see Figures 18, 19 and 20). The operator next turns the knob 191 to move the pointer 206 upward on the chart 207 until the pointer registers with the space containing the letter "I", which in the chart shown in Figures 17 and 17$^a$ is the sixth space from zero line of the chart. During this upward movement of the pointer 206 a swinging movement is given to the shifting lever 133 by the movement of the sprocket chain 183 driven from the hub 187 of the wheel 188. The swinging movement given to the shifting lever 133 is transmitted by the side arms 130, 131 to the gripping head 128 whereby the shifting bar 126 and with it the work bed 26 is moved from the right to the left a proportionate distance relative to the movement of the pointer 206 from zero position to the space containing the letter "I" which in the chart 207 is in the sixth space above zero, as plainly shown in Figures 17 and 17$^a$. The operator now turns the knob 191 in the opposite direction to move the pointer 206 down until it reaches the space containing the letter "I" of the chart 208. During this downward movement the shifting lever 133 is swung in the opposite direction from that previously described and consequently the gripping head 128 is caused to slide freely from the left to the right on the shifting bar 126 without moving the latter as the shifting bar 126 is held locked by the ball 146. The operator next turns the knob 191 to move the pointer 206 upon the chart 207 until it registers with the space on the chart 207 containing a period punctuation mark located in the fourth space above zero of the chart 207. During this movement of the pointer 206 the work bed 26 is again shifted from the right to the left by the action of the shifting lever 133 and the gripping head 128, and then the knob 191 is turned in the opposite direction to move the pointer 206 downward until it registers with the punctuation mark on one space above zero of the chart 208. During this downward movement of the pointer 206 the work bed 26 remains at a standstill while the gripping head 128 is again moved freely from the left to the right on the shifting bar 126 without moving the latter. The operator next turns the knob 191 to move the pointer 206 upward until it registers with the space on the chart 207 marked "space." During this movement of the pointer the work bed 26 is again shifted from the right to the left by the action of the shifting lever 133 and the gripping head 128, and then the knob 191 is turned in the opposite direction to move the pointer 206 downward until it registers with the space marked "space" in the chart 208. During this downward movement of the pointer 206 the work bed 26 remains at a standstill while the gripping head 128 is moved freely from the left to the right on the shifting bar 126 without moving the latter. The operator next turns the knob 191 to move the pointer 206 in register with the letter "J" on the sixth space above zero of the chart 207 and during this movement the work bed 26 is again shifted from the right to the left. The knob 191 is turned next in the opposite direction to move the pointer 206 downward until it registers with the space marked "J" in the chart 208. During this downward movement the work bed 26 remains at a standstill while the gripping head 128 is again moved freely to the right on the shifting bar 126 without moving the latter. The above described operation is repeated for the several letters contained in the word "JOHN", as will be readily understood by reference to Figures 18 and 20, the pointer 206 being returned to zero after it had been in register with the letter "N" on the lower chart 208.

In case it is desired to add another punctuation mark or an apostrophe after the letter "N" then the above described operation is repeated by the operator moving the pointer 206 into register with the corresponding punctuation mark or apostrophe on the charts 207, 208 and as the said marks require but short spacing the corresponding marks are located on the diagonal portion of the chart 208 and consequently a corresponding movement is given to the work bed 26. It is understood that during the repeated movement of the work bed 26 from the right to the left the pointers 223 and 224 have been moved with it and the pointer 223 now indicates on the graduation 221 two inches which correspond to the space between the starting point 301 and the finished mark 302, shown in Figure 20. The operator next moves the work bed 26 and its shifting bar 126 to the left until the pointers 223 and 224 are in central position on the scale 220, that is, with the pointer 224 in register with zero of the graduation 222. The coated plate 30 is now shifted on the section 27 of the work bed 26 and locked in place thereon by the screw 29 with the point of the needle 31 above the transverse middle of the legend to be engraved. The operator next presses the release rods 143 and 152 to release the work bed 26 and its shifting bar 126 to allow shifting of the work bed 26, with the plate 30 locked thereon, to the right until the pointer 224 registers with the twentieth mark on the graduation 222. It is understood that as this graduation 222 is 1 to 2 relative to the graduation 221 the shifting of the work bed 26 to the right to the twenty points mentioned on the graduation 222 divides the space from the starting point 301 to the finished mark 302 into equal parts, that is, the work bed 26 has been shifted one-half the length of the legend "I. JOHN" to be copied on the plate 30. The operator now turns the knob 191 to move the pointer 206 up on the chart 207 to the letter "I" whereby the work bed 26 is shifted from the right to the left a distance corresponding to that from the starting mark 301 to the middle of the letter "I" (see Figure 20). The operator now takes hold of the master plate 115 and shifts the same sidewise until the center mark 120 of the letter "I" registers with the mark 121 and then the operator takes hold of the handles 255 of the transmitter 70 and with the stylus 112 traces the letter "I" while holding the handle 254 of the lever 250 in release position so that the point of the needle 31 is in engagement with the coated surface of the plate 30, as shown in Figure 2. When the letter "I" has been traced the operator releases the handle 254 to allow the needle 31 to rise out of engagement with the coated plate 30. The operator next turns the knob 191 to move the pointer 206 down to the letter "I" on the lower chart 208 and then turns the knob 191 in the opposite direction to cause the pointer 206 to travel upward until it registers with the period punctuation mark on the chart 207. During this upward movement of the pointer the work bed 26 is shifted a distance corresponding to the distance between the center lines of the letter "I" and the period punctuation mark (see Figure 20). The operator now again shifts the master plate 115 until the center line 120 of the period punctuation mark is in register with the mark 121 and then the operator takes hold of the transmitter handles 255 and traces with the stylus 112 the punctuation mark while the handle 254 of the lever 250 is kept pressed to cause the needle 31 to engrave the punctuation mark in the coated surface of the plate 30. When this has been done the lever 250 is released to raise the needle 31. The operator now turns the knob 191 to move the pointer 206 downward until it registers with the period punctuation mark on the chart 208 and then turns the knob 191 in the opposite direction to move the pointer 206 upward until it registers with the space marked space on the chart 207, and then the operator turns the knob 191 to move the pointer 206 downward in register with the space marked space on the chart 208 and then turns the knob in the opposite direction to move the pointer upward until it registers with the letter "J" marked on the chart 207. During this double movement the work bed 26 is shifted from the right to the left a distance corresponding to that between the center lines of the punctuation mark and the letter "J." The master plate 115 is shifted until the positioning mark 120 of the letter "J" registers with the mark 121, then the operator manipulates the transmitter 70 to trace this letter with the stylus 112 and while the handle 254 of the lever 250 is pressed to cause the needle 31 to inscribe the letter "J" in the coated surface of the plate 30. The bed 26 is now again positioned for the next letter "O" and then the master plate 115 is correspondingly shifted until the position mark 120 of the letter "O" registers with the mark 121, and then the operator manipulates the transmitter to trace the letter "O" with the stylus and while the handle 254 of the lever 250 is pressed to cause the needle 31 to inscribe the letter "O" on the coated surface of the plate 30. The above-described operation is repeated for the next letters "H" and "N," and then the pointer 206 is returned to zero position and when this has been done the pointer 224 registers with the mark 2 on the graduation 222 to the left of the zero mark thereof, as indicated in Figure 20. From the foregoing it will be seen that by the arrangement described absolutely accurate spacing of the characters is obtained irrespective of their shape and width, and the words are engraved accurately on the predetermined spaces on the plate 30 by the use of the spacing device above set forth.

Figure 4:
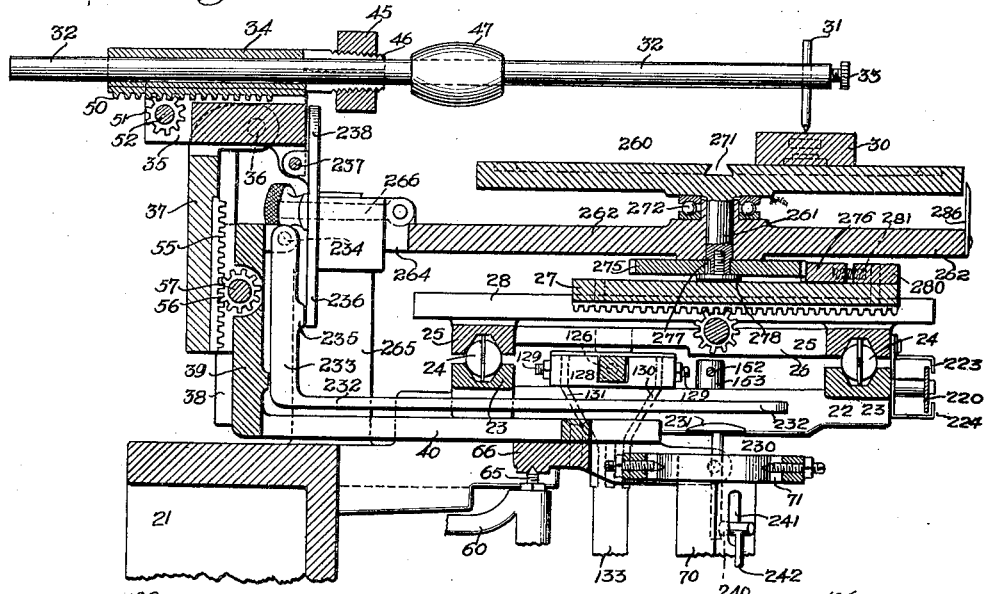
Figure 4 is a cross section of the same on the line 4—4 of Figure 3.

In case it is desired to locate a word to be engraved in an arch line or in an inverted arch line, the operator turns the knob 58 to raise the needle support 32 and with it the needle 31 to the position shown in Figure 2. The operator next places the rack 276 in position on the auxiliary bed 27 of the work bed 26, and the support 262 with the revoluble work bed 260 thereon is swung into active position over the work bed 26 and locked in this position by the locking bolt 266 engaging the stud 265, as shown in Figures 3 and 4. It is understood that when the support 262 is swung into active position the gear wheel 275 moves in mesh with the rack 276 and consequently the revoluble work bed 260 is turned from the work bed 26 receiving an intermittent sliding motion from the left to the right by the action of the shifting lever 133 of the spacing device. It is understood that the spacing device is actuated the same as above described relative to the straight line work and the transmitter is correspondingly actuated for tracing each letter to be engraved on the master plate 115 by the stylus 112.

When it is desired to engrave words of different size from the same master plate 115 and keep them in the same straight line on the plate 30 without readjusting the auxiliary work bed 27, use is made of a gage 310 pivoted at 311 on a bracket 313 attached to the column 21. The gage 310 is normally in rearmost position as shown in Figure 2, and the gage is provided at its free end with a point 312 adapted to indicate on the bottom line of the letters on the master plate 115 at the time the gage 31 is swung forward into gaging position on the master plate 115, to accurately register with the vertical position of the transmitter 70. It is understood that the holder 116 is shifted transversely on the base 118 until the bottom line of the master plate 115 registers with the point 312 of the gage, after which the holder 116 is fastened in position by the bolt 119 and then the gage 310 is swung back into inactive position. When another master plate 115 with letters thereon in a different position is placed on the holder 116 then the holder 116 is unlocked and the gage 310 is swung into active position, after which the holder 116 is shifted until the bottom line of the letters on this master plate registers with the point 312. The holder 116 is then fastened in place and the gage 310 is returned to inactive position.

It will be noticed that by the arrangement described two master plates, one with the higher and the other with the lower characters thereon are properly positioned relative to their bottom lines to insure proper engraving on the plate 30 of words of different height in the same line.

Having thus described my invention, I claim as new and desire to secure by Letters Patent:—

1. In an engraving machine, a needle support carrying a needle, a work bed adapted to support a coated plate to be acted on by the said needle, a carriage carrying the said needle support, manually controlled means imparting motion to the said carriage, and a mounting for the said carriage comprising links pivotally connected with each other, one of the links being pivoted on a fixed part and the other link being pivotally connected with the said carriage.

2. In an engraving machine, a carriage, and a mounting for the same comprising a pair of links pivotally connected with each other, one of the links being pivoted on a fixed part and the other link being pivotally connected with the carriage.

3. In an engraving machine, a needle support carrying a needle, a work bed adapted to support a coated plate to be acted on by the said needle, a fixed support on which the said work bed is mounted to slide sidewise, a carriage carrying the said needle support, a transmitter connected with the said carriage, a spacing device connected with the said work bed and including a shifting lever, an adjustable pivot for the said transmitter, an adjustable pivot for the said shifting lever, and manually controlled minute graduated adjusting devices for the said pivots.

4. In an engraving machine, a carriage, a transmitter having a universal joint connection with the said carriage and an adjustable pivot for the said transmitter and comprising a sleeve slidable on the transmitter, a ring provided with centers on which the said sleeve is hung, fixed centers, a bracket hung on the said fixed centers and provided with a graduated guideway, and a clamping bolt adjustably secured to the said guideway and engaging the said sleeve.

5. In an engraving machine, a work bed, a fixed support on which the said work bed is mounted to slide sidewise, a spacing device connected with the said work bed and including a shifting lever and an adjustable pivot for the same, the said adjustable pivot comprising a sleeve mounted to slide on the shifting lever, a bracket provided with centers engaging the said sleeve, a fixed support having a graduated guideway and a clamping bolt adjustably secured to the said guideway and engaging the said sleeve.

6. In an engraving machine, a work bed adapted to support a coated plate, a needle support carrying a needle adapted to act on the surface of the said coated plate, manually controlled means connected with the said needle support to raise or lower the same, and manually controlled means connected with the said needle support to move the same forward or backward.

7. In an engraving machine, a revoluble work bed adapted to support a coated plate, a needle support carrying a needle adapted to act on the surface of the said coated plate, and spacing means for turning the said work bed relative to the said needle.

8. In an engraving machine, a main work bed mounted to slide sidewise, an auxiliary revoluble work bed adapted to be moved into position above the said main work bed and adapted to support a coated plate, and means connecting the said main work bed with the said auxiliary work bed to turn the latter according to the sidewise movement of the main work bed.

9. In an engraving machine, a needle support carrying a needle, a revoluble work bed adapted to carry a coated plate to be acted on by the said needle, means rotating the said work bed, and means adjusting the said work bed and needle support one relative to the other to locate the needle forward or rearward relative to the center of the work bed.

10. In an engraving machine, a needle support carrying a needle, a revoluble work bed adapted to carry a coated plate to be acted on by the said needle, means rotating the said work bed, and means moving the said needle support forward or backward to locate the needle forward or rearward relative to the center of the work bed.

11. In an engraving machine, a needle support carrying a needle, a sidewise movable work bed, a revoluble work bed intermediate the said needle and the sidewise movable work bed, and means connecting the said sidewise movable work bed with the said revoluble work bed to turn the latter from the former.

12. In an engraving machine, a needle support carrying a needle, a sidewise movable work bed, a revoluble work bed intermediate the said needle and the sidewise movable work bed, a rack on the said sidewise movable work bed, and a gear wheel on the said revoluble work bed and in mesh with the said rack.

13. In an engraving machine, a needle support carrying a needle, a sidewise movable work bed, a revoluble work bed intermediate the said needle and the sidewise movable work bed, a rack on the said sidewise movable work bed, a gear wheel on the said revoluble work bed and in mesh with the said rack, and means imparting a forward or backward motion to the said needle support to locate the needle forward or rearward of the center of the said revoluble work bed.

14. In an engraving machine, a needle support carrying a needle, a sidewise slidable work bed arranged below the said needle, a bracket mounted to swing laterally between the said needle and the said work bed, a revoluble work bed mounted to turn on the said bracket and adapted to support a coated plate to be acted on by the said needle, and means connecting the said sidewise slidable work bed with the said revoluble work bed to rotate the latter on imparting a sidewise motion to the said slidable work bed.

15. In an engraving machine, a needle support carrying a needle, a sidewise slidable work bed arranged below the said needle, a bracket mounted to swing laterally between the said needle and the said work bed, a revoluble work bed mounted to turn on the said bracket and adapted to support a coated plate to be acted on by the said needle, means connecting the said sidewise slidable work bed with the said revoluble work bed to rotate the latter on imparting a sidewise motion to the said slidable work bed, and means adjusting the said needle support up or down to move the said needle into working position relative to a coated plate on either of the said work beds.

16. In an engraving machine, a needle support carrying a needle, a bracket, a revoluble work bed mounted to turn on the said bracket and adapted to carry a coated plate to be acted on by the said needle, a graduation and a pointer therefor, one being on the peripheral face of the said work bed and the other on the said bracket.

17. In an engraving machine, a needle support carrying a needle, a holder in which the said needle support is mounted to slide, means fastening the said needle support in place in the holder, a guideway in which the said holder is mounted to slide, and means under the control of an operator and connected with the said holder to adjust the latter in the guideway.

18. In an engraving machine, a needle support carrying a needle, a holder in which the said needle support is mounted to slide, means fastening the said needle support in place in the holder, a guideway in which the said holder is mounted to slide, means under the control of an operator and connected with the said holder to adjust the latter in the guideway, and a bracket on which the said holder is pivoted.

19. In an engraving machine, a needle support carrying a needle, a holder in which the said needle support is mounted to slide, means fastening the said needle support in place in the holder, a guideway in which the said holder is mounted to slide, means under the control of an operator and connected with the said holder to adjust the latter in the guideway, a bracket on which the said holder is pivoted, and means under the control of an operator to move the said bracket up or down.

20. In an engraving machine, a needle support carrying a needle, a holder in which the said needle support is mounted to slide, means fastening the said needle support in place in the holder, a guideway in which the said holder is mounted to slide, means under the control of an operator and connected with the said holder to adjust the latter in the guideway, a bracket on which the said holder is pivoted, and spring controlled means connected with the said needle support to support the latter normally in raised position.

21. In an engraving machine, a work bed adapted to support a plate to be engraved, a needle support carrying a needle adapted to act on the surface of the said plate, a carriage carrying the said needle support, a transmitter imparting motion to the said carriage, and a controlling device mounted on the said transmitter and controlling the said needle support.

22. In an engraving machine, a work bed adapted to support a plate to be engraved, a needle support carrying a needle adapted to act on the surface of the said plate, a carriage on which the said needle support is pivoted, a transmitter having a universal joint connection with the said carriage, a lever fulcrumed on the said carriage, and a manually controlled actuating device connected with the said lever to hold the needle support normally in raised position, the said actuating device being mounted on the said transmitter.

23. In an engraving machine, a work bed adapted to support a plate to be engraved, a needle support carrying a needle adapted to act on the surface of the said plate, a carriage on which the said needle support is pivoted, a transmitter having a universal joint connection with the said carriage, a lever fulcrumed on the said carriage, a button slidable on the said transmitter and engaging the free end of the said lever to hold the needle support normally in raised position, and manually controlled means on the transmitter and connected with the said button to hold the latter normally in raised position and to move the button downward to allow the needle support to swing downward.

24. In an engraving machine, a work bed adapted to support a plate to be engraved, a needle support carrying a needle adapted to act on the surface of the said plate, a carriage on which the said needle support is pivoted, a transmitter having a universal joint connection with the said carriage, a lever fulcrumed on the said carriage, a button slidable on the said transmitter and engaging the said lever, a bell crank lever pivoted on the transmitter and connected with the said button, and a spring-pressed hand lever fulcrumed on the said transmitter and connected with the said bell crank lever.

25. In an engraving machine, a pair of charts each provided with characters arranged in spaced lines, the characters in a line being of approximately the same width, the charts having adjacent diagonal edges and zero lines intersecting the said diagonal edges approximately midway between their ends.

26. In an engraving machine, a table, a pair of charts slidably mounted on the said table, each of the charts having spaced lines and characters in the spaces between the lines, the charts having adjacent diagonal edges intersected by sundry of the said lines and spaces and zero lines intersecting the said diagonal edges approximately midway between their ends.

27. In an engraving machine, a master plate provided with characters arranged in a row, an adjustable holder for the said master plate, and a gage adapted to register with the bottom line of the said row of characters.

28. In an engraving machine, a fixed support, a holder mounted to slide transversely on the said support and having means fastening the said holder in an adjustable position, a master plate provided with a row of characters and held on the said holder, and a gage hinged on the said support and provided at its free end with a pointer adapted to register with the bottom line of the said row of characters.

29. In an engraving machine, a revoluble work bed adapted to support a coated plate, a needle support carrying a needle adapted to act on the surface of the said coated plate, a holder in which the said needle support is adjustably mounted, and manually controlled means for adjusting the said holder.

30. In an engraving machine, a work bed adapted to support a coated plate, a needle support carrying a needle adapted to act on the surface of the said plate, a holder in which the said needle support is adjustably secured, a guideway in which the said holder is mounted to slide in the direction of the length of the said needle support, and means under the control of an operator for adjusting the said guideway.

31. In an engraving machine, a work bed adapted to support a coated plate, a needle support carrying a needle adapted to act on the surface of the said plate, a holder in which the said needle support is adjustably secured, a guideway in which the said holder is mounted to slide in the direction of the length of the said needle support, means under the control of an operator for adjusting the said guideway, a bracket mounted to slide up and down and in which the said guideway is mounted to swing up and down, and means under the control of an operator for moving the said bracket up or down.

32. In an engraving machine, guideways provided with a positioning mark, a movable pointer adapted to register with the said positioning mark, and a pair of upper and lower charts slidably mounted on the said guideways and each having spaced lines and characters in the spaces between the lines, one of the lines on each chart being a zero line adapted to register with the said positioning mark.

33. In an engraving machine, guideways provided with a positioning mark, a movable pointer adapted to register with the said positioning mark, and a pair of upper and lower charts slidably mounted on the said guideways and each having spaced lines and characters in the spaces between the lines, one of the lines on each chart being a zero line adapted to register with the said positioning mark, sundry of the said characters being punctuation marks located above the said zero lines of the said charts.

BENJAMIN R. CORLEY.